United States Patent [19]

Clifford

[11] Patent Number: 4,952,325
[45] Date of Patent: Aug. 28, 1990

[54] APPARATUS AND METHOD FOR CLEANING FILTERED ACCUMULATION FROM AN ANNULAR FILTER

[75] Inventor: Graham F. Clifford, Stanley, N.C.

[73] Assignee: Gaston County Dyeing Machine Co., Stanley, N.C.

[21] Appl. No.: 249,600

[22] Filed: Sep. 26, 1988

[51] Int. Cl.⁵ .............................. B08B 5/04; B08B 3/02
[52] U.S. Cl. ..................................... 210/741; 134/18; 134/22.12; 134/113; 134/144; 134/172; 210/143; 210/391; 210/407; 210/797
[58] Field of Search ................. 15/312 A, 312 R, 352; 55/283, 294; 210/108, 143, 137, 391, 394, 403, 407, 409, 411, 414, 412, 413, 741, 784, 791, 797, 798

[56] References Cited

U.S. PATENT DOCUMENTS

| | | | |
|---|---|---|---|
| 3,303,635 | 2/1967 | Sherrill | 55/294 |
| 3,345,805 | 10/1967 | Sherrill | 55/294 |
| 3,483,675 | 12/1969 | King, Jr. | 210/394 |
| 3,563,474 | 2/1971 | Robinson | 134/172 |
| 3,606,897 | 9/1971 | Tobin et al. | 134/86 |
| 3,620,234 | 11/1971 | Everroad | 134/86 |
| 3,665,547 | 5/1972 | Boylan | 134/166 R |
| 3,979,289 | 9/1976 | Bykowski | 210/798 |
| 4,154,588 | 5/1979 | Herndon, Jr. | 55/283 |
| 4,207,181 | 6/1980 | Drori | 210/409 |
| 4,261,831 | 4/1981 | Linsenmeyer | 210/391 |
| 4,299,245 | 11/1981 | Clapper | 134/144 |
| 4,325,395 | 4/1982 | Ferrari | 134/152 |
| 4,412,920 | 11/1983 | Bolton et al. | 210/413 |
| 4,522,716 | 6/1985 | Lavalley | 210/394 |
| 4,585,019 | 4/1986 | Jacobson | 134/144 |
| 4,634,537 | 1/1987 | Schreiber | 210/784 |
| 4,678,564 | 7/1987 | Moorehead et al. | 210/108 |
| 4,808,234 | 2/1989 | McKay et al. | 210/354 |

Primary Examiner—Frank Spear
Assistant Examiner—Joseph Drodge
Attorney, Agent, or Firm—Shefte, Pinckney & Sawyer

[57] ABSTRACT

Cylindrical textile filters of the radially outward filtration flow type such as utilized in textile wet processing systems are cleaned of filtered accumulation in an inclined filter housing wherein the filter is continuously rotated while a spray nozzle travels axially along the length of the filter applying a high velocity spray of cleaning water radially inwardly with respect to the filter. Simultaneously, a shower-like water spray is applied axially through the filter interior to flush the filtered accumulation as it is dislodged by the high-pressure spray nozzle.

39 Claims, 6 Drawing Sheets

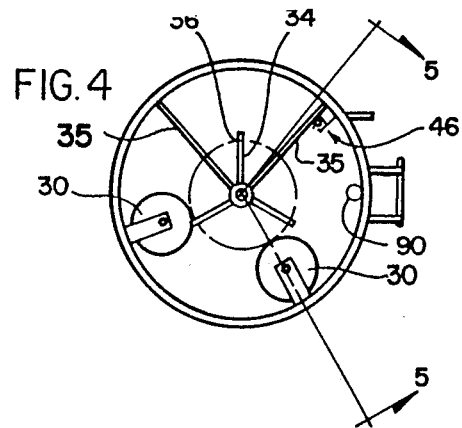
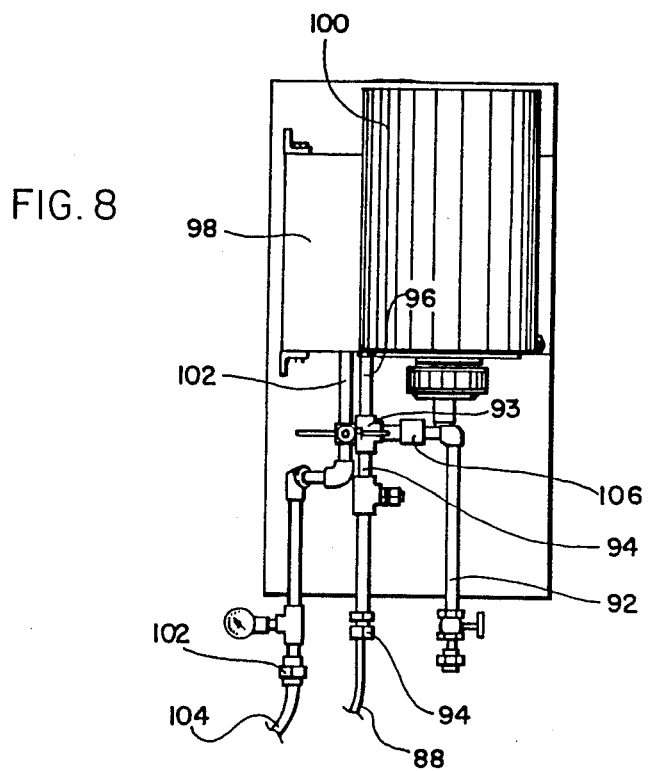
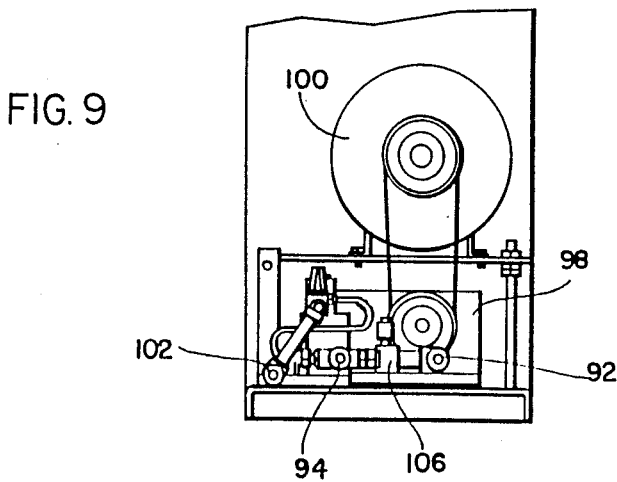

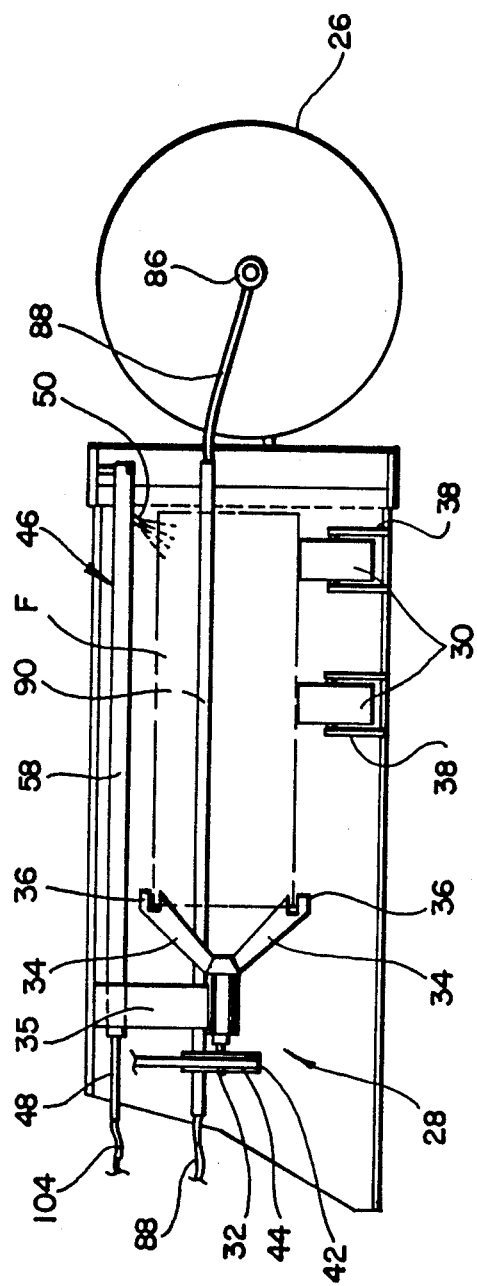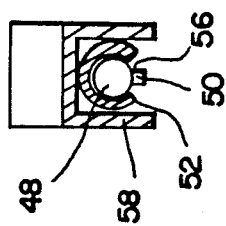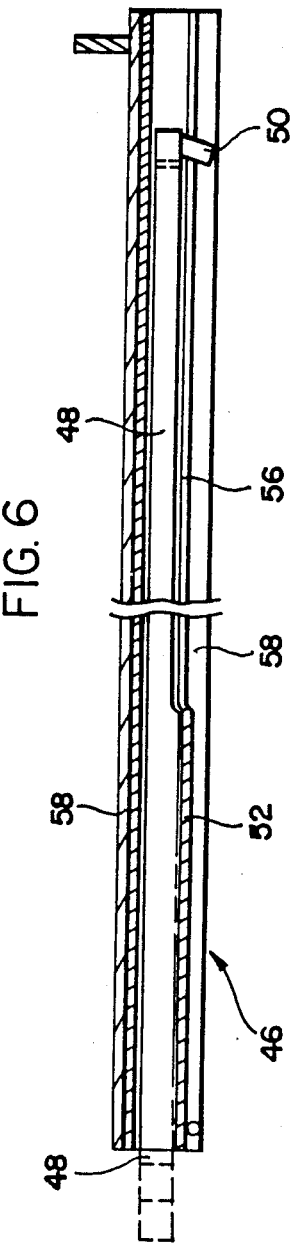

APPARATUS AND METHOD FOR CLEANING FILTERED ACCUMULATION FROM AN ANNULAR FILTER

BACKGROUND OF THE INVENTION

The present invention relates to apparatus and methods for cleaning annular filters and, more particularly, to an apparatus and method for cleaning accumulated fibrous material from a cylindrical textile filter of the type utilized in textile processing systems.

The textile dyeing and like wet processing machinery, it is common for the mechanical and fluid forces exerted on the fabric material being processed to cause a small proportion of the fibers in the material to be released from the body of the material. Such fibers typically tend to become entrained in the treating fluid as it flows through the machine's fluid circulation system and to gradually accumulate at susceptible locations within the circulation system. Over time, fibrous accumulations of this sort restrict the normal flow of treating fluid and, in extreme cases, may require stoppage of the machine for cleaning.

To prevent fluid flow restriction and to minimize machine stoppages, it has become common practice to utilize a filtration arrangement in the fluid circulating system of such textile wet processing machinery. Commonly, a cylindrical filter having an annular filtering media of perforated stainless steel is utilized as a filter, with the direction of fluid flow through the filter typically being radially outwardly from the interior of the filter. Over the cource of normal operation, fibrous material released from fabrics under treatment is deposited about the interior surface of the annular filter media, requiring the filter to be periodically removed from the et processing machine for cleaning of the filtered accumulation.

While such filtering systems advantageously serve their intended purpose of separating fibrous material from the circulated treating fluid, the periodic cleaning of the filters is obtain a difficult task in that the necessarily small perforations of the filter media and the relatively high fluid flow rates with attendant fluid turbulence produced by conventional wet processing machines combine to cause the filtered fibrous material to be projected through the filter media perforations and to become entangled with one another both at the interior and exterior surfaces of the filter media. As a result, the accumulation of filtered fibrous material becomes firmly lodged and entangled in the filter media and cannot be simply lifted or washed from the interior surface of the filter media.

Conventionally, such filters are manually cleaned by an operator utilizing a pressurized water hose which, while generally effective, has several disadvantages. While the use of a pressurized stream of water is normally effective in disentangling accumulated fibrous material from the filter media in a localized area at which the water stream is directly applied, there is a tendency of the water stream, particularly at higher pressures, to carry the dislodged material across the interior of the filter and redeposit the material at the opposite interior side of the filter media. Overall, this manual filter cleaning process is time-consuming and annoying to complete. In fact, it is not uncommon for filter cleaning by this technique to require twenty minutes or more of operator time.

SUMMARY OF THE INVENTION

It is accordingly an object of the present invention to provide an apparatus and method for automated cleaning of filtered accumulation from an annular filter, particularly a cylindrical textile filter of the radial outward filtration flow type.

Briefly summarized, according to the apparatus and method of the present invention, an annular filter requiring cleaning is removed from its normal filtration operation and placed in a cleaning housing adapted for containing the filter. A spray arrangement directs a pressurized emission of a cleaning fluid within the housing against the filter in a direction opposite the normal direction of filtering flow therethrough for dislodging the filtered accumulation from the filter, while another mechanism produces relative rotation of the filter and the spray arrangement within the housing for applying the fluid emission of the spray arrangement to the full annular extent of the filter.

The preferred embodiment of the present apparatus and method is particularly adapted for cleaning accumulated fibrous material from an interior surface of a cylindrical filter media in a textile filter of the radial outward filtration flow type such as commonly utilized in textile wet processing systems, wherein the accumulated fibrous material tends to become entangled in the filter media. In the preferred apparatus and method, a mechanism is provided for rotating the filter within the housing and the spray arrangement is supported by another mechanism for movement axially with respect to the cylindrical filter media along its outer periphery and for radially inward emission of the cleaning fluid with respect to the filter media. The spray arrangement is adapted for producing a highly-pressurized emission of the cleaning fluid sufficient for disentangling the accumulated fibrous material from the filter media. In this manner, the cleaning fluid is applied to substantially the full circumferential and axial extents of the filter media to fully clean accumulated fibrous material therefrom.

Preferably, the housing is arranged for supporting the filter at an upward angle with respect to horizontal, with the spray support mechanism being adapted for moving the spray arrangement downwardly along the axial extent of the filter media during the spraying operation. The spray arrangement includes a spray nozzle which produces a fan-like fluid emission pattern oriented axially with respect to the filter. Further, the spray nozzle is arranged to direct its fluid emission angularly with respect to the axial extent of the filter in the direction of axial movement of the spray arrangement. A control arrangement senses the delivery pressure of the cleaning fluid and operates to prevent actuation of the spray arrangement, the filter rotation mechanism and the spray support mechanism when the delivery pressure is below a predetermined minimum value. In addition, an auxiliary arrangement operates to direct a flushing flow of cleaning fluid through the housing axially with respect to the filter during the spray-cleaning operation for removing disentangled accumulated fibrous material.

The spray arrangement preferably comprises a substantially linear fluid conduit with the spray nozzle mounted to the conduit. The supporting mechanism for the spray arrangement includes a guide tube mounted in substantially fixed disposition within the housing lengthwise of the filter. The fluid conduit of the spray arrangement is slidably supported within the guide tube with the spray nozzle projecting outwardly through a longitudinal slot formed in the guide tube in generally facing relation to the filter.

The supporting mechanism further includes a fluid displacement linear actuator connected to the spray arrangement for actuating its axial movement along the cylindrical filter. A restrictor is provided in the fluid flow system of the linear actuator for restricting its rate of fluid displacement during its operating stroke to regulate the speed of movement of the linear actuator. A timer arrangement is also associated with the supporting mechanism for the spray arrangement to maintain the spray directed at the opposite axial ends of the filter media for predetermined respective time periods at the beginning and conclusion of the operating stroke of the linear actuator. The fluid flow system of the linear actuator is further arranged to bypass the restrictor when returning displaced fluid to the linear actuator during its return stroke for greater speed of movement of the linear actuator during its return stroke than during its operating stroke.

BRIEF DESCRIPTION OF THE DRAWINGS

FIG. 4 is a view taken from the front of the filter cleaning apparatus of FIGS. 1-3 axially with respect to the cleaning housing with the access door in its open position;

FIG. 5 is an axially cross-sectional view through the cleaning housing of FIG. 4 taken along line 5—5 thereof;

FIG. 6 is a detailed cross-sectional view taken axially through the spray guide arrangement within the cleaning housing of FIGS. 4 and 5;

FIG. 7 is another cross-sectional view of the spray guide arrangement of FIG. 6 taken along line 7—7 thereof;

FIG. 8 is a plan view of the cleaning fluid supply system of the filter cleaning apparatus of FIG. 1 taken along line 8—8 thereof;

FIG. 9 is a rear elevational view of the cleaning fluid supply system of FIG. 8.

DESCRIPTION OF THE PREFERRED EMBODIMENT

Figure 1:
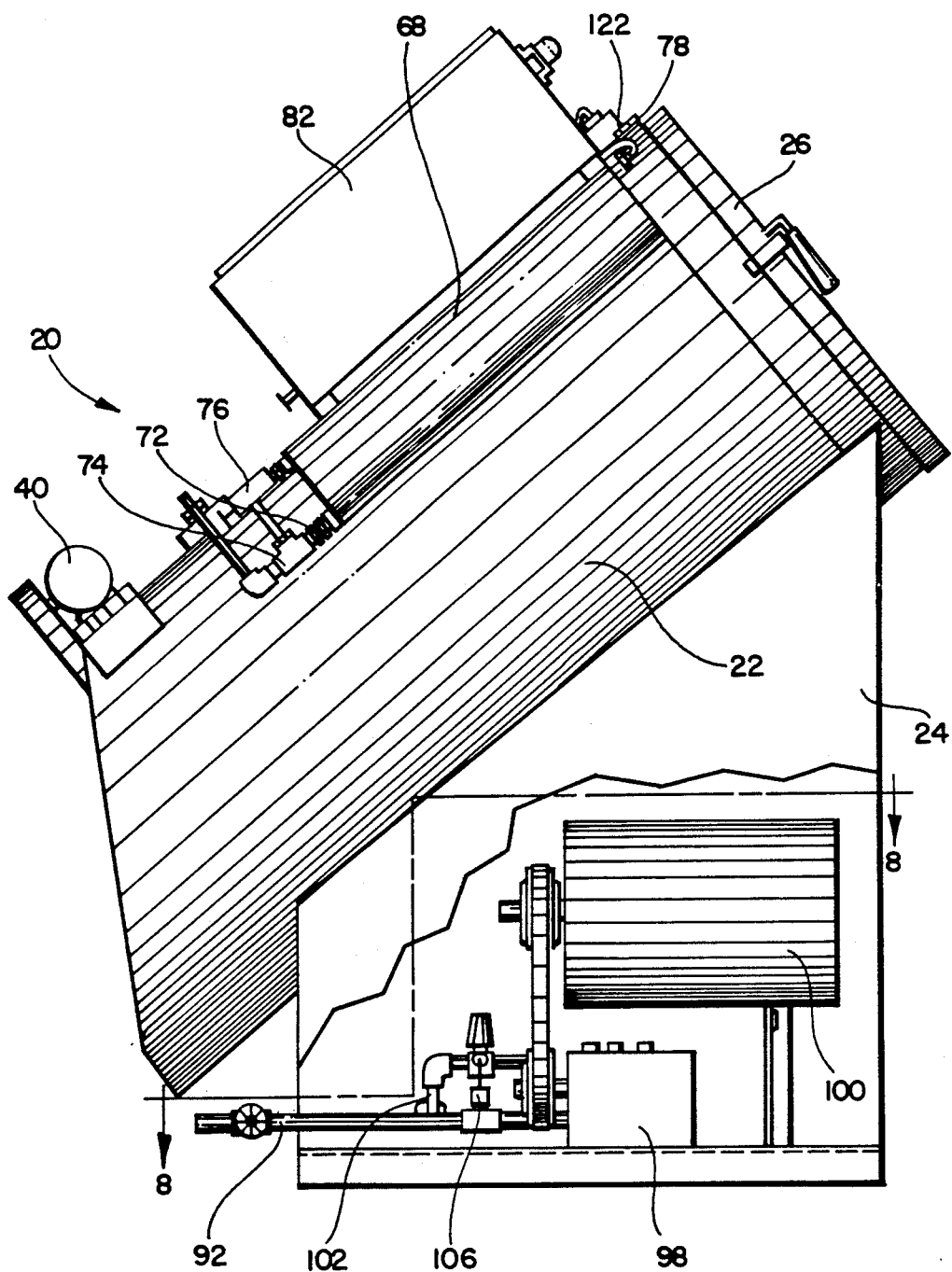
FIG. 1 is a side elevational view of a filter cleaning apparatus according to the preferred embodiment of the present invention.
Figure 2:
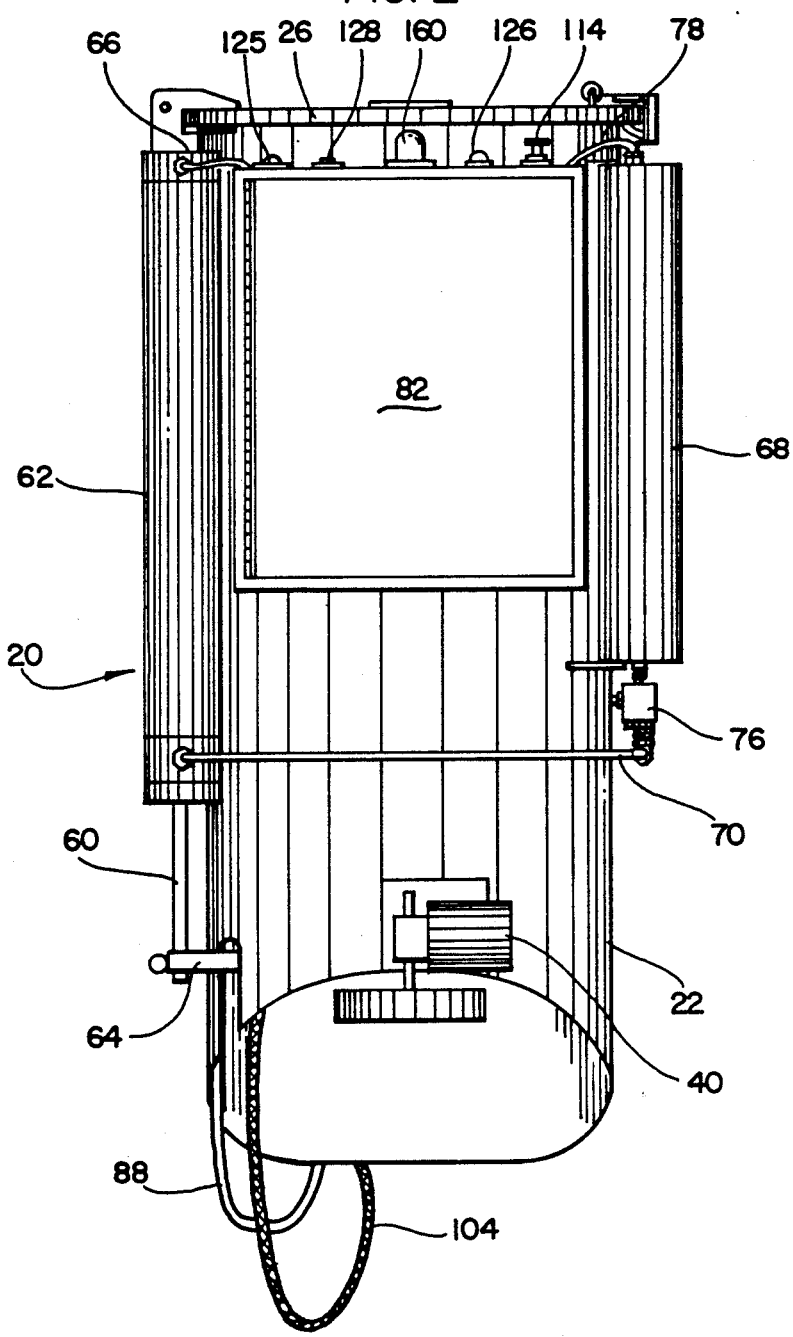
FIG. 2 is a top plan view of the filter cleaning apparatus of FIG. 1.
Figure 3:
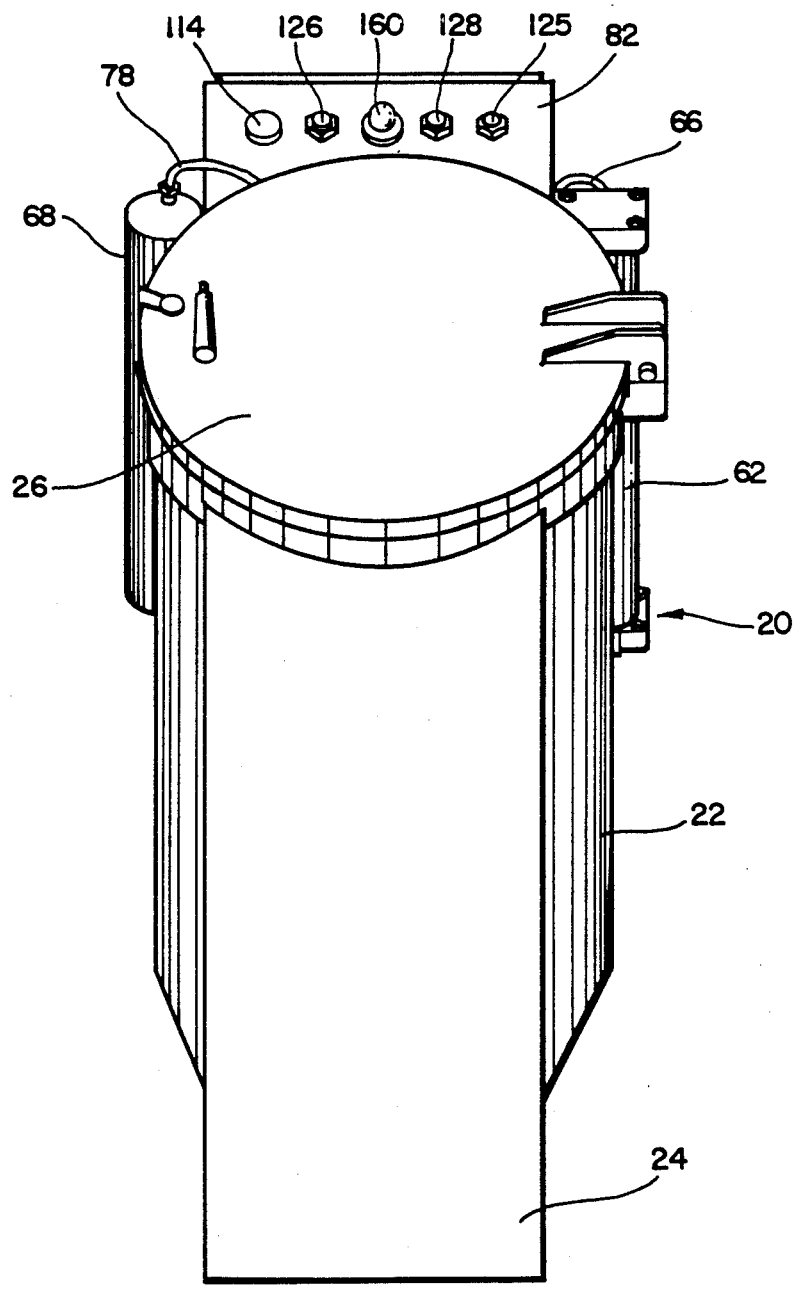
FIG. 3 is a front elevational view of the filter cleaning apparatus of FIGS. 1 and 2.

Referring now to the accompanying drawings and initially to FIGS. 1-3, a filter cleaning apparatus according to the preferred embodiment of the present invention is indicated generally at 20. The apparatus includes a substantially cylindrical filter cleaning housing 22 defining an interior chamber configured for containing a cylindrical textile filter of the aforedescribed type utilized commonly in textile wet processing machines, such a filter F being representatively shown in FIG. 5. The housing 22 is supported on a base 24 at an upward incline of approximately forty-five degrees with respect to horizontal. A door 26 is pivotably attached to the housing 22 at its upper forward end for opening and closing access into the housing interior, while the lower rearward end of the housing 22 is substantially open.

As seen in FIGS. 4 and 5, a filter drive assembly 28 is supported within the interior of the housing 22 adjacent its lower rearward end and two pairs of rollers 30 are rotatably supported on the bottom interior wall surface of the housing 22 adjacent its upper forward end for cooperatively supporting a filter F rotatably within the housing interior. The filter drive assembly 28 includes a drive shaft 32 rotatably supported by a pair of arms 35 extending in radially converging relation from the interior wall of the housing 22. Three filter support arms 34 are affixed in equally-spaced radially-extending relation to the forward end of the shaft 32, each arm having a forwardly-facing slot 36 formed at its outer end for receiving the peripheral end edge of the filter F. The two pair of rollers 30 are supported by brackets 38 affixed to the bottom interior wall surface of the housing 22 at axial and circumferential spacings with respect to one another for disposition of the rollers 30 to rotatably engage and support the outer circumferential periphery of the filter F adjacent its end opposite the end supported by the arms 34 of the drive assembly 28. The shaft 32 of the drive assembly 28 is rotatably driven by a relatively small, reduced speed motor 40 mounted on the exterior of the housing 22 at its lower rearward end through a motor-driven belt 42 which is trained about a drive sprocket 44 affixed to the shaft 32.

A spray nozzle assembly, generally indicated at 46 in FIGS. 4 and 5, is supported axially within the interior of the housing 22. As seen in greater detail in FIGS. 6 and 7, the spray nozzle assembly 46 includes a substantially linear stainless steel conduit 48 having a fan-type spray nozzle 50 affixed to its forward end. The conduit 48 is slidably supported within a guide tube 54, preferably fabricated of a suitable plastic material, the tube 54 having a longitudinal guide slot 56 formed along a substantial portion of its length through which the nozzle 50 projects outwardly. The guide tube 54 is securely fitted within a U-shaped channel bracket 58 affixed axially to the interior wall surface of the housing 22 with the channel 58 and the guide slot 56 of the guide tube 54 each facing radially inwardly with respect to the housing interior. In this manner, the conduit 48 is reciprocably slidable axially with respect to the housing 22 and with respect to a filter F supported therein, with the nozzle 50 being maintained in a radial orientation with respect to the housing 22 and the filter F. The lateral legs of the channel 58 project inwardly to a greater extent than the spray nozzle 50 to protect the nozzle 50 from engagement by a filter when inserted and removed from the housing 22.

As mentioned, the nozzle 50 is of the type adapted to spray its fluid emission in a generally planar fan-like pattern, the spray nozzle 50 being oriented with respect to the conduit 48 and the guide tube 54 and channel 58 being oriented with respect to the housing 22 to cooperatively maintain the fluid emission pattern of the nozzle 50 generally in alignment with the axis of a supported filter F throughout the full range of axial movement of the nozzle 50. In addition, the nozzle 50 is affixed to the conduit 48 to be oriented as supported and guided by the spray nozzle assembly 46 at a slightly downward angle of approximately thirty degrees with respect to the axis of the filter F, as seen in FIG. 6, for direction of the emission pattern of the nozzle 50 at a slight angular offset from radial.

The end of the spray conduit 48 opposite the nozzle 50 projects outwardly from the lower rearward end of housing 22 and is connected by a bracket 64 to a reciprocable piston 60 of a pneumatic piston-and-cylinder assembly 62 mounted lengthwise to the exterior of the housing 22 in parallel relation to the spray nozzle assembly 46 for actuating linear reciprocation of the conduit 48 and the nozzle 50 slidably with respect to the guide tube 54 and the channel 58. The piston-and-cylinder assembly 62 is operated pneumatically for extension of its piston 60 by pressurized air delivered through an operating line 66 from a suitable source of compressed air (not shown), which ordinarily will be a centralized source of compressed air in the mill or plant in which the filter cleaning apparatus 20 is situated. In the fully retracted position of the piston 62, the housing of the piston-and-cylinder assembly 62 on the non-pressure side of the piston 60 is filled with a quantity of hydraulic oil drawn from an oil reservoir tank 68 through a conduit 70 extending between the tank 68 and the piston-and-cylinder assembly 62. As will be understood, pneumatic operation of the piston-and-cylinder assembly 62 during its operating stroke for extension of the piston 60 forces the stored quantity of oil to flow from the housing of the piston-and-cylinder assembly 62 through the line 70 into the reservoir tank 68. To control the speed of travel of the piston 60 through this operating stroke, a check valve 72 diverts the oil flow through a T-type fitting 74 and therefrom through a restrictor preferably in the form of a needle valve 76 which functions to regulate the rate of fluid flow to the reservoir tank 68 under the displacing force of the piston 60, the needle valve 76 being selected to thereby require a predetermined desired time period, preferably approximately three minutes, for completion of the full operating stroke of the piston. Retraction of the piston 60 through the opposite return stroke is actuated by switching application of the operating source of compressed air from the line 66 leading to the piston-and-cylinder assembly 62 to another line 78 leading to the upper end of the oil reservoir tank 68 to force the hydraulic oil to return through the line 70 into the housing of the piston-and-cylinder assembly 62. The check valve 72 opens in response to the thusly pressurized hydraulic oil to permit oil flow directly into the conduit 70 bypassing the needle valve 76 to actuate retraction of the piston 60 at a greater speed of travel during its return stroke than during its afore-described operating stroke.

Figure 10:
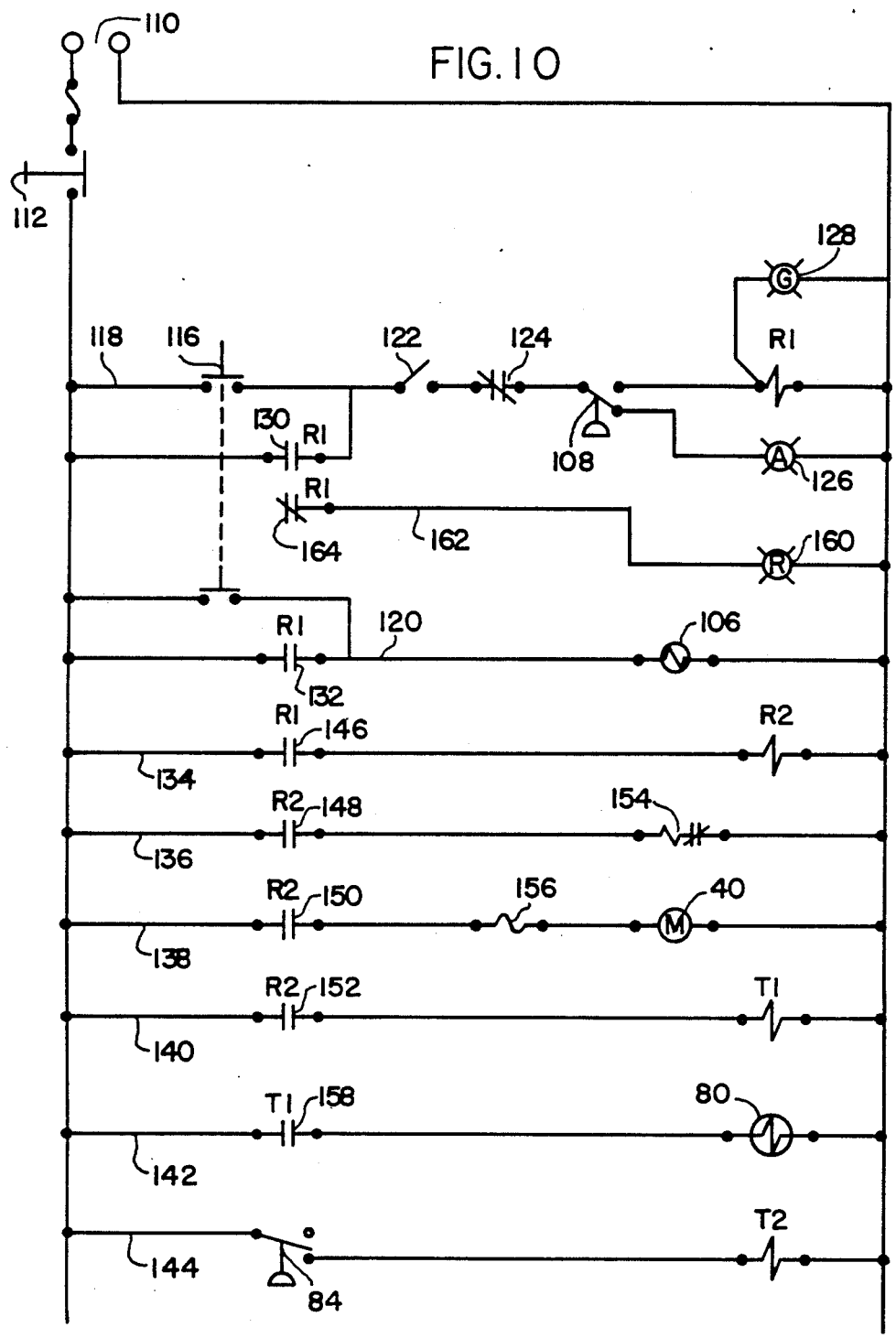
FIG. 10 is a schematic wiring diagram of the electrical control circuitry for the present filter cleaning apparatus.

The switching of the application of the common source of pressurized plant air between the lines 66 and 78 is actuated by a solenoid valve 80, shown only in FIG. 10, housed within the main control box 82 of the filter cleaning apparatus 20 into which the source of pressurized air is supplied. A pressure-sensing switch 84 (FIG. 10) also housed within the control box 82 is provided for monitoring the oil pressure applied to the needle valve 76 under the displacing force of the piston 60 to indicate the completion of its operating stroke by the attendant substantially total loss of oil pressure which correspondingly occurs at the needle valve 76, as more fully explained hereinafter.

As best seen in FIGS. 4 and 5, in addition to the spray nozzle assembly 46, a shower-type nozzle 86 is mounted to the interior surface of the housing door 26 generally centrally thereof and is attached to a flexible fluid supply hose 88 extending longitudinally within the interior of the housing 22 through a tubular guard member 90 affixed axially to the interior wall surface of the housing 22. The nozzle 86 is of a type adapted to produce a relatively low velocity fluid emission in a shower-like pattern, the nozzle 86 being oriented on the housing door 26 to face and direct its emission axially into the interior of a filter F supported in the housing 22.

Cleaning liquid is delivered to each of the spray nozzle assembly 46 and the shower nozzle 86 by a liquid supply system housed within the base 24 of the filter cleaning apparatus 20, as best seen in FIGS. 1, 8 and 9. Preferably ordinary tap water, from a municipal supply system or another suitable source of water under pressure, is utilized as the cleaning liquid, the supply system including a water inlet conduit 92 for connection to the selected water supply source. The inlet conduit 92 supplies incoming water to a T-type fitting 93 by which the supplied water is diverted into a first branch conduit 94 to which the flexible supply hose 88 of the shower nozzle 86 is directly connected and a second branch conduit 96 which is connected to the intake side of a conventional liquid pump 98 belt driven by an electric pump motor 100. The pressure output side of the pump 98 is connected to a delivery conduit 102 from which a flexible hose 104 extends to the conduit 48 of the spray nozzle assembly 46 to supply it with a relatively highly pressurized flow of cleaning water. A solenoid valve 106 is provided in the water inlet conduit 92 to control the admission of water from the supply source into the supply system. Additionally, a pressure-sensing switch 108, shown only in FIG. 10, is provided in the water inlet conduit 92 to monitor the supply pressure of the incoming water to insure a minimum delivery pressure, preferably fifteen pounds per square inch, as more fully explained hereinafter.

Referring now to FIG. 10, a schematic diagram of the electrical control circuitry for the filter cleaning apparatus 20 is shown. Operating electrical power for the filter cleaning apparatus 20 is supplied from a conventional source of 110 volt alternating electrical current indicated at 110, across which are connected several operating circuits with an "on-off" power supply switch 112 being provided in one leg of the power supply 110 for enabling the electrical control circuirty. An operating pushbutton 114 associated with the power supply switch 112 is situated on the forwardmost facing panel of the control box 82 for operating the switch 112. A normally-open actuating "start" switch 116 is connected in each of two parallel actuating circuits 118, 120. In the first actuating circuit 118, the actuating switch 116 is connected in series with a switch 122 operated by the housing door 26, a set of normally-closed contacts 124 of a timer relay T2 and the aforementioned pressure responsive switch 108 in the water inlet conduit 92, the pressure-responsive switch 108 being arranged to complete the actuating circuit 118 either through a relay R1 when the minimum water supply pressure prevails in the inlet conduit 92 or through a low-pressure signal lamp 126 when the prevailing inlet water pressure is less than the predetermined minimum. Another signal lamp 128 is connected in parallel with the relay R1 to be illuminated whenever the actuating circuit 118 is completed through the relay R1 for indicating that the filter cleaning apparatus 20 is in an operating condition. An operating pushbutton 125 for the actuating switch 116 is located on the forward panel of the control box 82 for easy operator access. Similarly, each of the signal lamps 126, 128 are conspicuously situated on the forward panel of the control box 82 for viewing by an operator. The switch 122 is preferably a microswitch mounted on the forward panel of the control box 82 immediately adjacent the forward access opening of the housing 22 for switch-closing engagement by the door 26 when in its closed position and for switch-opening disengagement when the door 26 is opened. In the second actuating circuit 120, the actuating switch 116 is connected in series with the aforementioned solenoid valve 106 in the water inlet conduit 92. In each of the actuating circuits 118, 120, a set of normally-open contacts 130, 132, respectively, associated with the relay R1 are arranged in parallel with the actuating switch 116 to close upon energization of the relay R1 for maintaining electrical current through each operating circuit 118, 120 following closing and re-opening of the actuating switch 116.

Six operating circuits 134, 136, 138, 140, 142, 144 are also connected across the power supply 110 in parallel with one another and with the actuating circuits 118, 120. In the operating circuit 134, another set of normally-open contacts 146 of the relay R1 are connected in series with another relay R2, which has three sets of normally-open contacts 148, 150, 152 connected respectively in each of the operating circuits 136, 138, 140. In the operating circuit 136, the relay contacts 148 are connected in series with a starter coil 154 associated with the pump motor 100. The relay contacts 150 in the operating circuit 138 are connected in series with the electric drive motor 40 of the filter drive assembly 28 and a fuse 156. In the operating circuit 140, the relay contacts 152 are connected in series with a timer relay T1. The timer relay T1 has a set of nromally-open contacts 158 which are connected in the operating circuit 142 in series with the aforementioned solenoid valve 80 in the pressurized air supply system for the piston-and-cylinder assembly 62 and the oil reservoir tank 68. The aforementioned timer relay T2 is connected in the operating circuit 144 with the aforementioned pressure sensing switch 84 associated with the needle valve 76. A cycle-termination signal lamp 160 is connected in a branch circuit 162 from the first actuating circuit 118 through a set of normally-closed contacts 164 of the relay R1.

The operation of the present filter cleaning apparatus 20 may thus be understood. A fiber-laden filter F requiring cleaning is inserted through the doorway into the interior of the housing 22 and positioned with a lower peripheral edge thereof received in the support arm slots 36 of the filter drive assembly 28 and with the opposite upper end of the filter F peripherally supported on the rollers 30. The housing door 26 is then closed and latched, closing at the same time the microswitch 122. The power supply pushbutton 114 is depressed to close the associated on-off switch 112 to enable the electrical control system for the filter cleaning apparatus 20. Upon depression of the pushbutton 125 to close the actuating switch 116, electrical power is supplied to each of the actuating circuits 118, 120. However, if the water pressure prevailing in the water inlet conduit 92 is less than the predetermined minimum pressure desired, the pressure sensing switch 108 completes the actuating circuit 118 only through the low pressure indicator lamp 126, the relay R1 remaining deenergized whereby none of the operating circuits 134-144 are completed. On the other hand, if the prevailing incoming water pressure in the conduit 92 meets or exceeds the predetermined minimum, the actuating circuit 118 is completed through the relay R1, illuminating the operating signal lamp 128.

At the same time, the second actuating circuit 120 is completed to open the solenoid valve 106 for admitting incoming water into each of the branch conduits 94, 96. The relay contacts 146 are closed at the same time to complete the operating circuit 134 which energizes the relay R2. Thereupon, the normally-open relay contacts 148, 150, 152 close to complete each of the operating circuits 136, 138, 140, thereby actuating the pump motor 100 and the filter drive motor 40 while energizing the timer relay T1. Accordingly, the filter F is rotated while high-pressure water is pumped through the spray nozzle 50 and relatively low-pressure water is delivered through the shower nozzle 86.

The timer relay contacts 158 remain open and the solenoid valve 80 remains deactuated to delay initiation of the operating stroke for the piston-and-cylinder assembly 62 for a predetermined dwell time established by the timer relay T1, preferably approximately fifteen seconds, whereby the spray nozzle 50 remains stationarily directed at the upper end of the filter F for such dwell time. Upon completion of the dwell time period, the contacts 158 of the timer relay T1 close, thereby actuating the solenoid valve 80 to deliver pressurized air to the piston-and-cylinder assembly 62 for beginning the operating stroke of the piston 60 and, correspondingly, the axial guided movement of the spray nozzle 50 along the length of the filter F. The pressure-sensing switch 84 associated with the needle valve 76 remains open so long as a detectable level of oil pressure prevails at the needle valve 76 under the displacing force of the moving piston 60. Preferably, for this purpose, the switch 84 is set to remain open so long as the prevailing oil pressure exceeds three pounds per square inch.

At the completion of the piston's operating stroke, the oil pressure prevailing at the needle valve 76 will be negligible, whereupon the switch 84 closes to complete the operating circuit 144 for energizing the timer relay T2. The associated timer relay contacts 124 in the actuating circuit 118 remain in their normally-closed state to continue energization of the relay R1 and continue the attendant completion of the operating circuits 134, 136, 138 for another delay period determined by the timer relay T2, whereby the nozzle 50 remains stationarily directed at the lower end of the filter F at the completion of the linear guided movement of the nozzle 50. Upon completion of the dwell time period of the timer relay T2, its normally-closed contacts 124 open to break the operating circuit 118. The relay R1 immediately de-energizes, thereby also breaking the second actuating circuit 120 and the operating circuits 134-144. The solenoid valve 80 then switches the application of the incoming pressurized air to the oil reservoir tank 68 to actuate the return stroke of the piston 60. Simultaneously, the relay contacts 164 return to their normally-closed state to illuminate the signal lamp 160 indicating the completion of the filter cleaning cycle of the apparatus 20.

As will thus be understood, the filter cleaning apparatus 20 of the present invention provides a number of significant advantages over the conventional manual cleaning of cylindrical textile filters. With the present apparatus 20, the filter F being cleaned is systematically rotated at a uniform speed while the spray nozzle 50 moves axially along the length of the filter at a uniform speed to apply the high pressure emission of the nozzle 50 to the full circumferential and axial extents of the filter media in a much more consistent and systematic fashion than is possible manually. The axially-oriented, high-pressure fan-like emission of the spray nozzle 50 serves during this systematic cleaning process to effectively disentangle the individual fibers of the accumulated fibrous material to dislodge the filtered accumulation, while the shower-like emission of the nozzle 86 serves to simultaneously flush the disentangled accumulation axially through the center of the filter F. In this respect, it is important that the spray emission from the nozzle 50 be at a sufficiently high velocity to essentially force the entangled individual fibers apart from one another and, for this purpose, the water pumping system of the apparatus is set up to deliver pumped cleaning water to the nozzle 50 at approximately 2000 pounds per square inch. The dislodged accumulation and the cleaning water are discharged through the open lower end of the housing 22, which is accordingly preferably situated over a drainage grate or other drainage structure in the textile mill or plant. The downward angle of the nozzle 50 with respect to the axis of the filter F assists in directing the dislodged accumulation to the open end of the housing 22 for discharge. In addition, the stationary dwell times of the spray nozzle 50 at the opposite ends of the filter F serve to insure a thorough cleaning of the opposite axial ends of the filter F which may be difficult to clean due to the characteristic provision of a solid circular frame ring at the filter ends.

An important advantage of the systematic filter cleaning provided by the present apparatus is the significant reduction in time required to complete cleaning of a filter. While as mentioned above the conventional manual cleaning of a cylindrical textile filter normally requires twenty minutes or more, the present invention is set up for a cleaning cycle of approximately three and one-half minutes, representing an approximately three minute travel time of the nozzle 50 to complete its full lengthwise operating movement plus the dwell times of the nozzle 50 at the opposite ends of the filter being cleaned, which is typically effective to fully clean a conventional cylindrical textile filter with a normal degree of filtered fibrous accumulation. As such, the present invention provides significant savings in operator time and, in turn, a more efficient use of labor resources, in addition to the aforementioned advantages of providing a more reliable, effective and easier manner of routine filter cleaning.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for cleaning filtered accumulation from an annular filter normally housed and operable in a separate filtering apparatus, characterized in that said apparatus includes means for cleaning said filter while removed from said filtering apparatus, said filter cleaning means comprising a cleaning housing separate from said filtering apparatus and adapted for containing said filter, spray means for directing a pressurized emission of a cleaning fluid within said housing against said filter in a direction opposite the normal direction of filtering flow therethrough for dislodging said filtered accumulation from said filter, means for producing relative rotation of said filter and said spray means within said housing for applying the fluid emission of said spray means to the full annular extent of said filter, and control means for sensing the delivery pressure of said cleaning fluid and for preventing actuation of said spray means and said relative rotation means when said delivery pressure is below a predetermined minimum value.

2. A filter cleaning apparatus according to claim 1 and characterized further in that said relative rotation means comprises means for rotating said filter within said housing with respect to said spray means.

3. A filter cleaning apparatus according to claim 1, wherein said annular filter has a lengthwise extent, and characterized further by means for producing relative movement of said filter and said spray means in a direction lengthwise with respect to said filter for applying the fluid emission of said spray means along the full length of said filter.

4. A filter cleaning apparatus according to claim 3 and characterized further in that said relative lengthwise movement means comprises means for moving said spray means lengthwise with respect to said filter.

5. A filter cleaning apparatus according to claim 4 and characterized further in that said spray means is arranged to direct its fluid emission angularly with respect to the lengthwise extent of said filter in the direction of lengthwise movement of said spray means.

6. A filter cleaning apparatus according to claim 4 and characterized further in that said moving means includes means for guiding movement of said spray means, said guiding means comprising a guide tube having a longitudinal slot formed therein and supported in substantially fixed disposition within said housing lengthwise of said filter with said slot generally facing said filter, said spray means comprising a substantially linear fluid conduit slidably supported within said guide tube and a spray nozzle mounted to said conduit and projecting outwardly through said slot of said guide tube.

7. A filter cleaning apparatus according to claim 4 and characterized further by means for regulating the speed of travel of said spray means along said filter.

8. A filter cleaning apparatus according to claim 7 and characterized further in that said moving means comprises a fluid displacement linear actuator connected to said spray means, said regulating means including means for restricting the rate of fluid displacement by said linear actuator during an operating stroke thereof for regulating the speed of movement of said linear actuator.

9. A filter cleaning apparatus according to claim 8 and characterized further in that said regulating means includes means bypassing said restricting means for returning displaced fluid to said linear actuator during a return stroke thereof for greater speed of movement of said linear actuator during its said return stroke than during it said operating stroke.

10. A filter cleaning apparatus according to claim 3 and characterized further by timer means associated with said relative longitudinal movement means for maintaining said spray means directed at the opposite ends of said filter for predetermined respective times.

11. A filter cleaning apparatus according to claim 1, wherein said annular filter has a lengthwise extent, and characterized further in that said housing includes means supporting said filter with its lengthwise extent at an upward angle with respect to horizontal and means for moving said spray means downwardly along the length of said filter.

12. A filter cleaning apparatus according to claim 1, wherein said annular filter has an open interior and is adapted for normal filtration flow into the interior and radially outwardly therefrom through said annular filter, and characterized further in that said spray means is arranged for radially inward fluid emission with respect to said filter.

13. A filter cleaning apparatus according to claim 1, wherein said annular filter has a lengthwise extent, and characterized further in that said spray means comprises a spray nozzle adapted for fluid emission in a generally planar fan-like pattern, said spray nozzle being arranged for orientation of the planar extent of said fluid emission pattern generally lengthwise with respect to said filter.

14. A filter cleaning apparatus according to claim 1, wherein said annular filter has a lengthwise extent, and characterized further by flush means for directing a flow of cleaning fluid through said housing lengthwise of said filter for removing dislodged filtered accumulation.

15. An apparatus for cleaning accumulated fibrous material from an interior surface of a cylindrical filter media in a textile filter normally housed and operable in a separate textile processing system, wherein said filter has an open interior and is adapted for normal filtration flow into the interior and radially outwardly therefrom through said cylindrical filter media causing said accumulated fibrous material to tend to become entangled in said filter media, characterized in that said filter cleaning apparatus includes means for cleaning said filter while removed from said textile processing system, said filter cleaning means comprising a generally enclosed cleaning housing separate from said textile processing system and adapted for containing said filter, means for rotating said filter within said housing, spray means for directing a sufficiently highly-pressurized emission of a cleaning fluid for disentangling said accumulated fibrous material from said filter media, means supporting said spray means within said housing for movement axially with respect to said cylindrical filter media along its outer periphery and for radially inward emission of said cleaning fluid with respect to said cylindrical filter media, whereby said cleaning fluid is applied to substantially the full circumferential and axial extents of said filter media, and control means for sensing the delivery pressure of said cleaning fluid and for preventing actuation of said spray means, said rotation means and said supporting means when said delivery pressure is below a predetermined minimum value.

16. A filter cleaning apparatus according to claim 15 and characterized further in that said housing includes means supporting said filter with its axial extent at an upward angle with respect to horizontal, and means for moving said spray means downwardly along the axial extent of said filter media.

17. A filter cleaning apparatus according to claim 15 and characterized further in that said spray means comprises a spray nozzle adapted for fluid emission in a generally planar fan-like pattern, said spray nozzle being arranged for orientation of the planar extent of said fluid emission pattern generally axially with respect to said filter.

18. A filter cleaning apparatus according to claim 15 and characterized further by flush means for directing a flow of cleaning fluid through said housing axially of said filter for removing disentangled accumulated fibrous material.

19. A filter cleaning apparatus according to claim 15 and characterized further by timer means associated with said supporting means for maintaining said spray means directed at the opposite axial ends of said filter media for predetermined respective times.

20. A filter cleaning apparatus according to claim 15 and characterized further in that said supporting means includes means for guiding reciprocating movement of said spray means, said guiding means comprising a guide tube having a longitudinal slot formed therein and supported in substantially fixed disposition within said housing axially of said filter with said slot generally facing said filter, said spray means comprising a substantially linear fluid conduit slidably supported within said guide tube and a spray nozzle mounted to said conduit and projecting outwardly through said slot of said guide tube.

21. A filter cleaning apparatus according to claim 15 and characterized further by means for regulating the speed of travel of said spray means along said filter.

22. A filter cleaning apparatus according to claim 21 and characterized further in that said supporting means comprises a fluid displacement linear actuator connected to said spray means, said regulating means including means for restricting the rate of fluid displacement by said linear actuator during an operating stroke thereof for regulating the speed of movement of said linear actuator.

23. A filter cleaning apparatus according to claim 21 and characterized further in that said regulating means includes means bypassing said restricting means for returning displaced fluid to said linear actuator during a return stroke thereof for greater speed of movement of said linear actuator during its said return stroke than during its said operating stroke.

24. A filter cleaning apparatus according to claim 15 and characterized further in that said spray means is arranged to direct its fluid emission angularly with respect to the axial extent of said filter in the direction of axial movement of said spray means.

25. A method of cleaning accumulated fibrous material from an interior surface of a cylindrical filter media in a textile filter normally housed and operable in a separate textile processing system, wherein said filter has an open interior and is adapted for normal filtration flow into the interior and radially outwardly therefrom through said cylindrical filter media causing said accumulated fibrous material to tend to become entangled in said filter media, said method comprising the steps of removing said filter from said textile processing system and containing said filter in a generally enclosed housing separate from said textile processing system, spraying a sufficiently highly-pressurized emission of a cleaning fluid within said housing radially inwardly with respect to said cylindrical filter media for disentangling said accumulated fibrous material from said filter media while rotating said filter within said housing and moving the fluid emission of said spraying axially with respect to said cylindrical filter media along its outer periphery for applying said cleaning fluid to substantially the full circumferential and axial extents of said filter media, sensing the delivery pressure of said cleaning fluid and preventing said spraying, said relative rotation and said moving when said delivery pressure is below a predetermined minimum value.

26. A filter cleaning method according to claim 25 and characterized further by supporting said filter with its axial extent at an upward angle with respect to horizontal, and moving the fluid emission of said spraying downwardly along the axial extent of said filter media.

27. A filter cleaning method according to claim 25 and characterized further by spraying said cleaning fluid in a generally planar fan-like emission pattern oriented with the planar extent of the pattern generally axially with respect to said filter.

28. A filter cleaning method according to claim 25 and characterized further by flushing cleaning fluid through said housing axially of said filter for removing dislodged filter accumulation.

29. A filter cleaning method according to clsim 25 and characterized further by maintaining said spraying directed at the opposite axial ends of said filter media for predetermined respective times.

30. A filter cleaning method according to claim 25 and characterized further by regulating the speed of travel of said spraying along said filter.

31. A filter cleaning method according to claim 25 and characterized further in that said moving the fluid emission of said spraying comprises operating a fluid displacement linear actuator, sad regulating including restricting the rate of fluid displacement by said linear actuator during an operating stroke thereof for regulating the speed of movement of said linear actuator.

32. A filter cleaning method according to claim 31 and characterized further in that said regulating includes bypassing said restricting for returning displaced fluid to said linear actuator during a return stroke thereof for greater speed of movement of said linear actuator during its said return stroke than during its said operating stroke.

33. A filter cleaning method according to claim 31 and characterized further by directing the fluid emission of said spraying angularly with respect to the axial extent of said filter moving in the direction of axial movement of said spraying.

34. An apparatus for cleaning filtered accumulation from an annular filter having a lengthwise extent and normally housed and operable in a separate filtering apparatus, characterized in that said apparatus includes means for cleaning said filter while removed from said filtering apparatus, said filter cleaning means comprising a cleaning housing separate from said filtering apparatus and adapted for containing said filter, spray means for directing a pressurized emission of a cleaning fluid within said housing against said filter in a direction opposite the normal direction of filtering flow therethrough for dislodging said filtered accumulation from said filter, means for producing relative rotation of said filter and said spray means within said housing for applying the fluid emission of said spray means to the full annular extent of said filter, means comprising a fluid displacement linear actuator connected to said spray means for moving said spray means in a direction lengthwise with respect to said filter for applying the fluid emission of said spray means along the full length of said filter, and means for regulating the speed of travel of said spray means along said filter, said regulating means including flow restrictor means for restricting the rate of fluid displacement by said linear actuator during an operating stroke thereof for regulating the speed of movement of said linear actuator.

35. A filter cleaning apparatus according to claim 34 and characterized further in that said regulating means includes means bypassing said restricting means for returning displaced fluid to said linear actuator during a return stroke thereof for greater speed of movement of said linear actuator during its said return stroke than during its said operating stroke.

36. An apparatus for cleaning accumulated fibrous material from an interior surface of a cylindrical filter media in a textile filter normally housed and operable in a separate textile processing system, wherein said filter has an open interior and is adapted for normal filtration flow into the interior and radially outwardly therefrom through said cylindrical filter media causing said accumulated fibrous material to tend to become entangled in said filter media, characterized in that said filter cleaning apparatus includes means for cleaning said filter while removed from said textile processing system, and filter cleaning means comprising a generally enclosed cleaning housing separate from said textile processing system and adapted for containing said filter, means for rotating said filter within said housing, spray means for directing a sufficiently highly-pressurized emission of a cleaning fluid for disentangling said accumulated fibrous material from said filter media, means including a fluid displacement linear actuator connected to said spray means for supporting said spray means within said housing for movement axially with respect to said cylindrical filter media along its outer periphery and for radially inward emission of said cleaning fluid with respect to said cylindrical filter media, whereby said cleaning fluid is applied to substantially the full circumferential and axial extents of said filter media, and means for regulating the speed of travel of said spray means along said filter, said regulating means including flow restrictor means for restricting the rate of fluid displacement by said linear actuator during an operating stroke thereof for regulating the speed of movement of said linear actuator.

37. A filter cleaning apparatus according to claim 36 and characterized further in that said regulating means includes means bypassing said restricting means for returning displaced fluid to said linear actuator during a return stroke thereof for greater speed of movement of said linear actuator during its said return stroke than during its said operating stroke.

38. A method of cleaning accumulated fibrous material from an interior surface of a cylindrical filter media in a textile filter normally housed and operable in a separate textile processing system, wherein said filter has an open interior and is adapted for normal filtration flow into the interior and radially outwardly therefrom through said cylindrical filter media causing said accumulated fibrous material to tend to become entangled in said filter media, said method comprising the steps of removing said filter from said textile processing system and containing said filter in a generally enclosed housing separate from said textile processing system, spraying a sufficiently highly-pressurized emission of a cleaning fluid within said housing radially inwardly with respect to said cylindrical filter media for disentangling said accumulated fibrous material from said filter media while rotating said filter within said housing and operating a fluid displacement linear actuator for moving the fluid emission of said spraying axially with respect to said cylindrical filter media along its outer periphery for applying said cleaning fluid to substantially the full circumferential and axial extents of said filter media, and regulating the speed of travel of said spraying along said filter, said regulating including restricting the rate of fluid displacement by said linear actuator by flow restrictor means during an operating stroke thereof for regulating the speed of movement of said linear actuator.

39. A filter cleaning method according to claim 38 and characterized further in that said regulating includes bypassing said restricting for returning displaced fluid to said linear actuator during a return stroke thereof for greater speed of movement of said linear actuator during its said return stroke than during its said operating stroke.

* * * * *

UNITED STATES PATENT AND TRADEMARK OFFICE
CERTIFICATE OF CORRECTION

PATENT NO. : 4,952,325

DATED : August 28, 1990

INVENTOR(S) : Graham F. Clifford

It is certified that error appears in the above-identified patent and that said Letters Patent is hereby corrected as shown below:

Column 1, Line 13, reads "The" but should read -- In --.

Column 1, Line 33, reads "cource" but should read -- course --.

Column 1, Line 37, reads "et" but should read -- wet --.

Column 1, Line 42, reads "obtain" but should read -- often --.

Column 7, Line 31, reads "nromally" but should read -- normally --.

Column 13, Line 26, reads "clsim" but should read -- claim --.

Column 13, Line 36, reads "sad" but should read -- said --.

Signed and Sealed this

Twenty-seventh Day of October, 1992

*Attest:*

DOUGLAS B. COMER

*Attesting Officer*     *Acting Commissioner of Patents and Trademarks*